United States Patent [19]

Gillette

[11] 3,824,484

[45] July 16, 1974

[54] TOUCH-TONE SIGNAL GENERATION SYSTEM

[75] Inventor: Timothy C. Gillette, Cambridge, Mass.

[73] Assignee: Compound Computing Corporation, Bedford, Wis.

[22] Filed: Oct. 12, 1972

[21] Appl. No.: 296,791

[52] U.S. Cl. .................. 331/48, 179/84 T, 331/55, 331/56, 331/77, 331/109, 331/111, 331/143, 331/177 R, 331/179, 331/183

[51] Int. Cl. ....... H03b 3/02, H03b 3/04, H03b 5/24

[58] Field of Search .......... 331/48, 55, 56, 77, 109, 331/111, 143, 177 R, 179, 182, 183; 179/84 T

[56] References Cited

UNITED STATES PATENTS

| | | | |
|---|---|---|---|
| 3,424,870 | 1/1969 | Breeden et al | 331/142 X |
| 3,559,098 | 1/1971 | Chandos | 331/177 R X |
| 3,710,276 | 1/1973 | Dao | 331/77 X |

*Primary Examiner*—Herman Karl Saalbach
*Assistant Examiner*—Siegfried H. Grimm
*Attorney, Agent, or Firm*—Kenway & Jenney

[57] ABSTRACT

A touch-tone signal generation system includes a pair of oscillators for generating tones substantially the same as those employed in the system of American Telephone & Telegraph Co., under the trademark designation Touch-Tone each of which provides a selected tone pair for use in data communication systems. The oscillators include a capacitor; a charging circuit for the capacitor including a resistive network; and a threshold detector for triggering a one-shot whenever the charge on the capacitor reaches a predetermined threshold level. A resistor may be added in shunt in the resistance network to change the frequency of the oscillator in response to a switching signal. A divide-by-two flip-flop, which is triggered by the one-shot, provides a train of pulses which are filtered by a low pass filter to remove third harmonics. An amplitude weighting network compensates for the attenuation of the fundamental of the selected tone. Each oscillator includes a high pass network to block direct current components. The tones generated by the oscillators are of opposite phase so that the attack transients introduced by the high pass networks will be substantially canceled.

11 Claims, 7 Drawing Figures

TOUCH-TONE SIGNAL GENERATION SYSTEM

FIELD OF THE INVENTION

This invention relates in general to tone pair signal generation systems, of the type substantially the same as those employed by American Telephone & Telegraph Co. under the trademark designation Touch-Tone, and more particularly to a system for providing a selected pair of tones for use in a data communications system.

BACKGROUND OF THE INVENTION

In modern communications, it is frequently necessary to transmit digital data over telephone lines from remotely located terminals. In the system shown, for example, in the copending application Ser. No. 296,790, filed Oct. 12, 1972, a computer is interrogated via telephone lines from a number of dispersed inquiry locations included on a party line. This system employs a keyboard for making digital entries at a terminal, stores the digital entries at the terminal, and, when the message has been completely entered, transmits the message in tone pair code to the computer. Conventional touch-tone generators of the type commonly employed in telephone instruments, which directly generate tone pairs by the manual actuation of the keyboard switches, are not suitable for use in such a system which requires a touch-tone generator which can interface with logic level signals from the memory storing the digital entries.

SUMMARY OF THE INVENTION

It is accordingly the object of the present invention to provide an improved tone pair generating system compatible with data communications systems of the type described and capable of responding to logic level signals developed in such systems.

Briefly, the tone pair signal generator of the present invention comprises two tone pair oscillators, one for a selected frequency tone from a "low" group and the other from a selected frequency tone from a "high" group. Each of these tone pair, or touch-tone oscillators, includes a capacitor, a source of direct current voltage for charging the capacitor, and a resistance network coupling the source to the capacitor. The resistance network includes a first resistor and a plurality of branches, each including a second resistor and an electronic switch in series. Logic level signals are provided by the logic circuitry of the data communication system, one such logic level signal being provided for each electronic switch for the purpose of changing the frequency of the touch-tone oscillator. A voltage threshold detector is connected across the capacitor and provides a triggering signal when the charge on the capacitor reaches a predetermined voltage level. In order that variations in the voltage of the source will have no significant effect on oscillator frequency, the same direct current source is used for charging the capacitor and as a voltage reference for the threshold detector. A one-shot generator provides a pulse in response to the triggering signal and a transistor switch is responsive to a pulse provided by the one-shot for discharging the capacitor. The one-shot generator is enabled by a touch-tone keying signal, and, in the case of the low group oscillator, a signal for enabling the transmission of a busy tone. The frequency provided by the one-shot generator is double that required, and the pulses provided by the one-shot generator are applied to a divide-by-two flip-flop which provides pulses of the desired frequency. Because the third and higher odd harmonics of the square wave are undesirable in the touch-tone signal, a simple low pass filter is employed to attenuate these. Since this filter inadvertently attenuates the fundamental frequencies which are selected in a non-uniform manner, an amplitude weighting network is provided to compensate for this variable attenuation of the fundamental frequencies. This amplitude weighting network includes a source of direct current voltage connected across a first weighting resistor connected in series with a second weighting resistor with the pulses being coupled to the junction between the first and second weighting resistors. A third weighting resistor and means responsive to the logic level signal which selected the frequency of the oscillator effectively connect the third weighting resistor in shunt with the first weighting resistor to alter the amplitude weighting of the pulses for the frequency selected by the logic level signal. This is accomplished by providing the third weighting resistor in series with a diode between the source of direct current voltage and the junction between the first and second weighting resistors, the means responsive to the logic level switching signal maintaining the junction between the third weighting resistor and the diode at a relatively low potential in the absence of the logic level switching signal so that the diode effectively isolates the third weighting resistor from the junction between the first and second weighting resistors and, in the presence of the logic level switching signal, maintains the junction between the third weighting resistor and the diode at a relatively high potential so that the diode effectively connects the third weighting resistor to the junction between the first and second weighting resistors. A summing amplifier combines the selected tones from each oscillator. In order to block direct current components, each oscillator includes a high pass network, which introduces attack transients. In order to minimize the effect of these transients, the tones from each oscillator are provided in phase opposition so that the attack transients are substantially canceled.

DESCRIPTION OF PREFERRED EMBODIMENT

Figure 1:
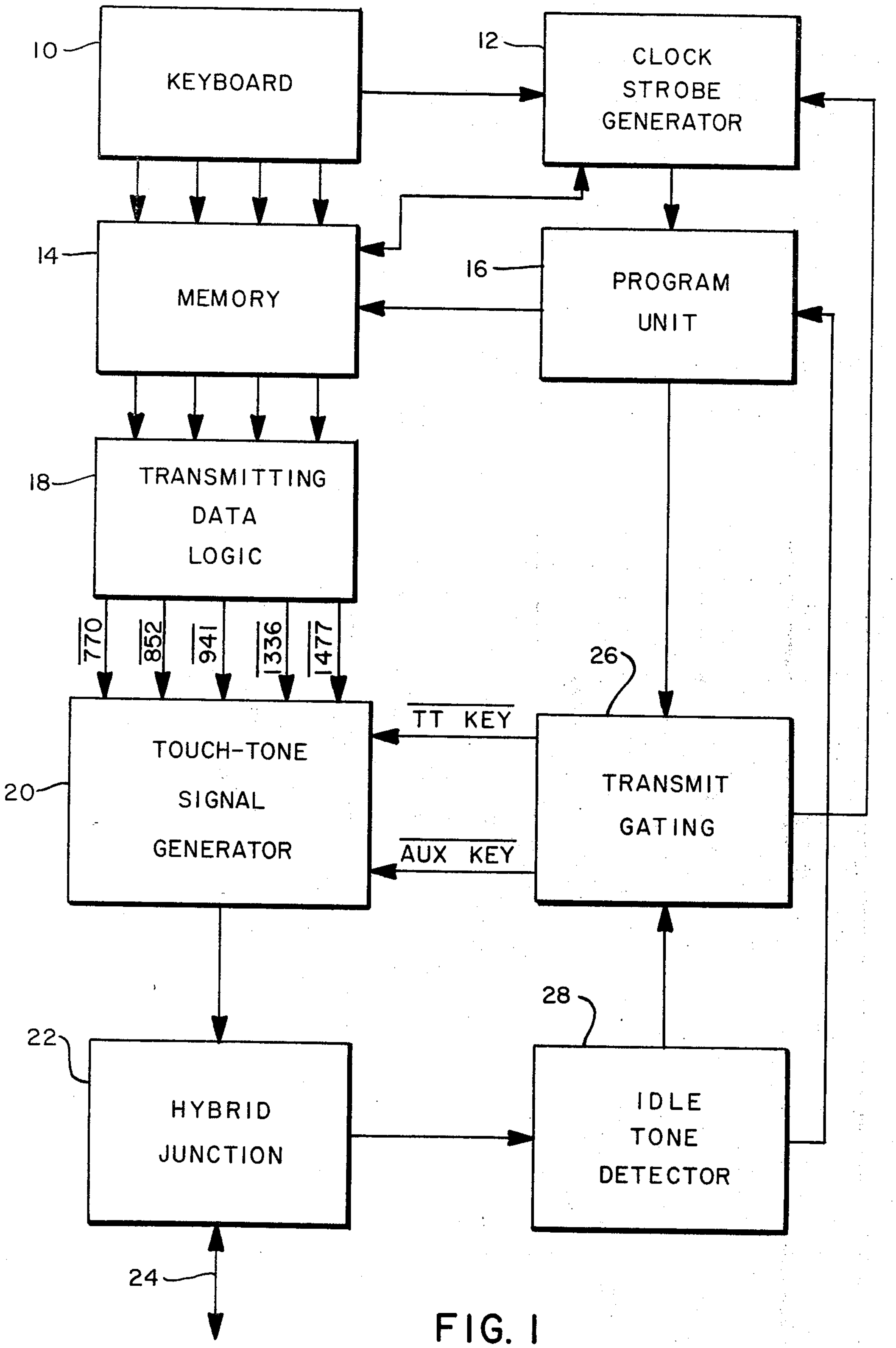
FIG. 1 is an illustration in block diagrammatic form of a portion of a data communication terminal showing its relationship to a touch-tone signal generator of the present invention.

In FIG. 1 there is shown the main components in block diagrammatic form of a terminal of the data communication system as disclosed in copending application Ser. No. 296,790 filed Oct. 12, 1972, illustrating the relationship of the touch-tone signal generator of the present invention to the terminal. A keyboard 10 includes a plurality of data entry keys and appropriate switching circuitry to provide a four bit output code indicative of which of twelve keys have been actuated and additionally a common key signal indicating when any key has been actuated. This latter signal is provided to a clock and strobe generator 12, while the signals indicating which of the keys have been depressed are connected to a memory unit 14. Under the influence of signals from the clock and strobe generator 12 and from a program unit 16, the data entered in memory 14 is transferred to a transmitting data logic network 18 which provides a plurality of logic level switching signals $\overline{770}$, $\overline{852}$, $\overline{941}$, $\overline{1336}$, and $\overline{1447}$ on a plurality of corresponding lines to touch-tone signal generator 20. As will be presently described, these logic level switching signals will be used for controlling the frequencies generated by the touch-tone signal generator. These generated frequency tones will be provided through hybrid junction 22 to a telephone line 24. A transmit gating unit 26 provides a touch-tone keying signal $\overline{\text{TT KEY}}$ and a "not busy" signal $\overline{\text{AUX KEY}}$ enabling the touch-tone oscillator 20 only when a signal from an idle tone detector 28 indicates that line 24 is "not busy". The program unit 16 provides actuating program signals to the memory 14 and the transmit gating circuit 26 in addition to providing a reset signal at the end of operation for all of the units. The transmit gating unit 26 is a logic unit for enabling touch-tone generator 20 and for allowing the signals to be shifted from memory 14 to actuate touch-tone generator 20 only when the idle tone detector 28 presents the "not busy" idle signal and when the program unit 16 indicates that the timing is correct in terms of a "reply" key having been actuated and a strobe pulse having been received from the clock and strobe generator 12. It will be understood, that only those portions of the terminal as are necessary for a proper understanding of the relationship therewith of touch-tone signal generator 20 have been included in FIG. 1. For a fuller description and disclosure of this terminal, reference is again made to copending application Ser. No. 296,790, filed Oct. 12, 1972.

Figure 2:
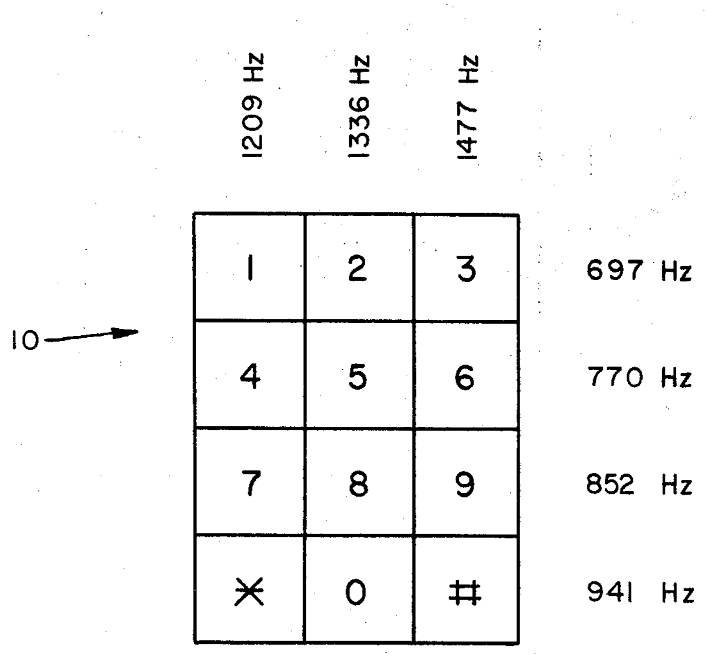
FIG. 2 is a diagram illustrating a keyboard employed in such a system showing the frequencies selected by each key in a preferred embodiment of the invention.

Turning now to FIG. 2, the keys of keyboard 10 and their relationship to the tone pairs to be generated by touch-tone signal generator 20 will be seen. Twelve keys are provided and are arranged in three columns and four rows and are respectively identified by the indicia 1, 2, 3, 4, 5, 6, 7, 8, 9, *, 0, and #. Each of the keys in the first column is associated with the 1209 Hz. tone; each of the indicia in the second column is associated with the 1,336 Hz. tone; and each of the indicia in the third column is associated with the 1,447 Hz. tone. Likewise, each of the indicia in the first row is associated with the 697 Hz. tone; each of the indicia in the second row is associated with the 770 Hz. tone; each of the indicia in the third row is associated with the 852 Hz. tone; and each of the indicia in the bottom or fourth row is associated with the 941 Hz. tone. Whenever one of the keys of keyboard 10 is depressed, a tone pair corresponding to its row and column frequencies will be generated.

Figure 3:
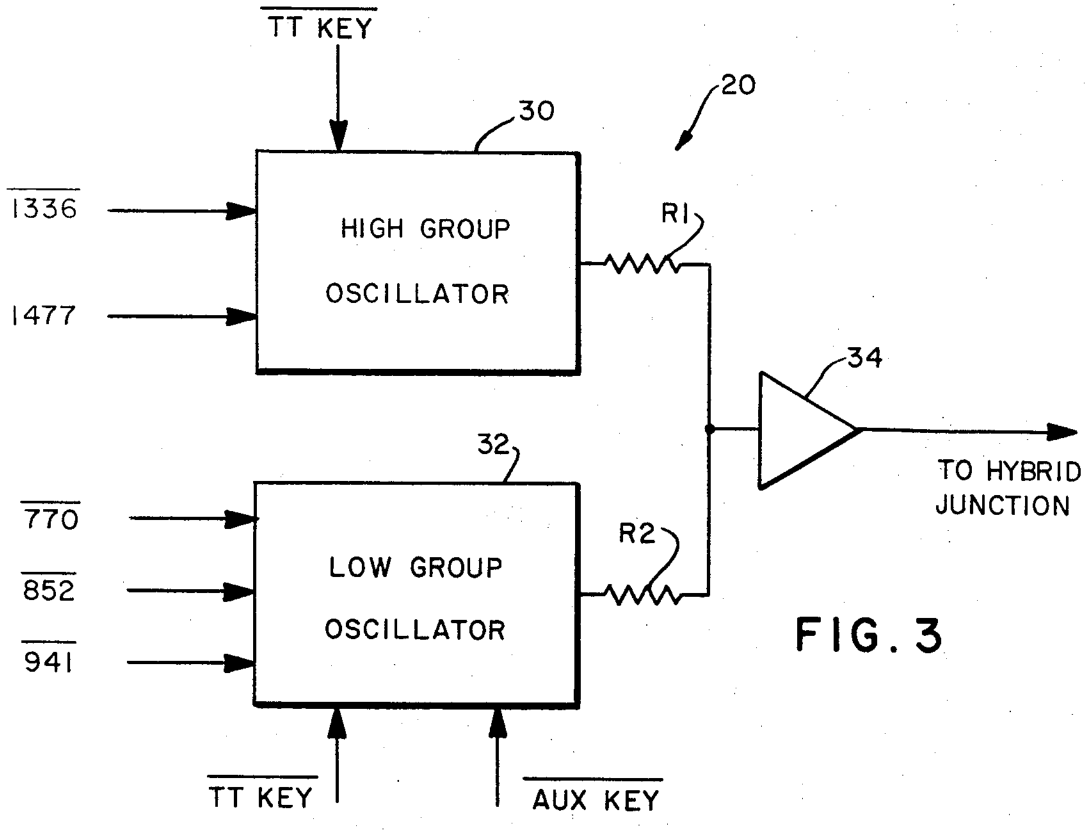
FIG. 3 is a block diagram of the touch-tone signal generator of the present invention.

Turning to FIG. 3, it will be seen that touch-tone signal generator 20 comprises a pair of touch-tone oscillators, "low" group oscillator 32 and "high" group oscillator 30. Logic level switching signals $\overline{770}$, $\overline{852}$, and $\overline{941}$ are applied from transmitting data logic 18 (see FIG. 1) to "low" group oscillator 32, while logic level signals $\overline{1336}$ and $\overline{1477}$ are applied from the transmitting data logic to "high" group oscillator 30. In addition, the transmit gating unit (see FIG. 1) provides a touch-tone keying signal $\overline{\text{TT KEY}}$ to both oscillators 30 and 32. It is to be noted also that a "not busy" signal $\overline{\text{AUX KEY}}$ provided from the transmit gating unit is applied to "low" group oscillator 32. The tone outputs of "high" group oscillator 30 and "low" group oscillator 32 are applied through coupling resistors $R_1$ and $R_2$ respectively to a summing amplifier 34 by means of which the touch-tone pairs are applied to the hybrid junction.

Figure 4:
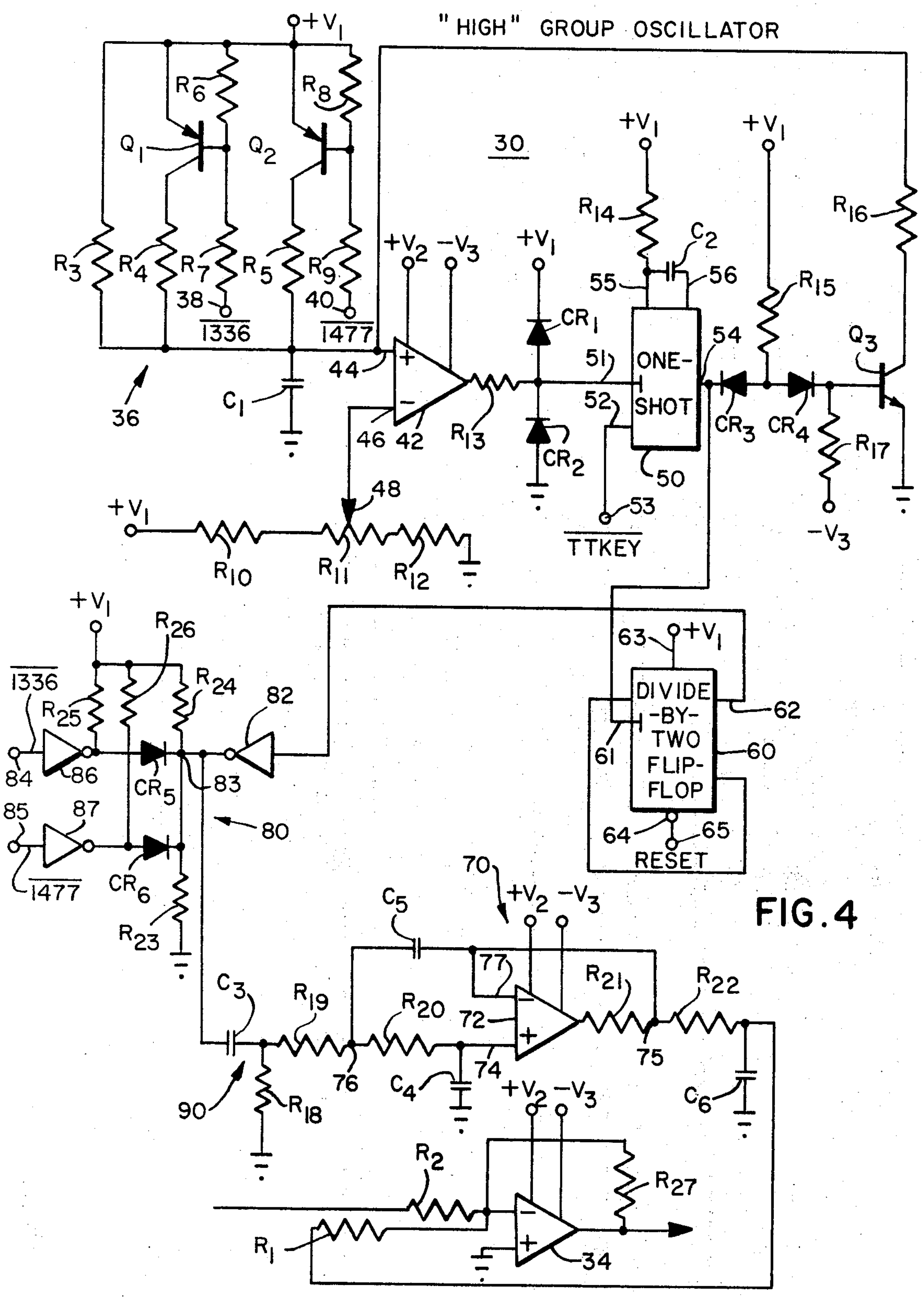
FIG. 4 is a circuit diagram of a "high" group oscillator of the present invention.

The circuit for "high" group oscillator 30 is shown in FIG. 4. The oscillator includes a resistive network 36 which couples a positive direct current voltage source $V_1$ of, for example, five volts to a storage capacitor $C_1$. Resistive network 36 includes three parallel branches. The first branch comprises a timing resistor $R_3$; the second branch comprises a timing resistor $R_4$; and the third parallel branch comprises a timing resistor $R_5$. It will be noted that resistor $R_4$ is connected in series with a transistor switch $Q_1$, while resistor $R_5$ is connected in series with a transistor switch $Q_2$. A biasing resistor $R_6$ connects the base electrode of transistor $Q_1$ to voltage source $V_1$, and a switching signal is applied through a coupling resistor $R_7$ from a terminal 38. In particular, the switching signal is the logic level signal $\overline{1336}$ provided from the transmitting data logic. When the logic level signal applied to terminal 38 is pulled down, transistor $Q_1$ is turned on to connect resistor $R_4$ in parallel with resistor $R_3$. By the same token, transistor $Q_2$ has a biasing resistor $R_8$ connected between its base and direct current source $V_1$, and a switching signal is applied to coupling resistor $R_9$ from terminal 40. In the particular example given, the logic level signal $\overline{1477}$ is applied to terminal 40 so that whenever logic level signal $\overline{1477}$ is pulled down transistor Q2 will be turned on to connect resistor $R_5$ in parallel with resistor $R_3$.

It will thus be seen that oscillator 30 is a precision programmable oscillator having a period of oscillation which is determined by the time it takes to charge capacitor $C_1$. The basis time constant is determined by timing resistor $R_3$. In the absence of logic level signals $\overline{1336}$ and $\overline{1477}$, transistor switches $Q_1$ and $Q_2$ are non-conducting; and the frequency produced by the oscillator will be related to the lowest tone in the "high" group. When, however, transistor switch $Q_1$ is turned on, the resistance of resistance network 36 including resistors $R_3$ and $R_4$ in parallel will be such that a frequency related to the 1,336 Hz. tone will be produced. In like manner, the turning on of transistor switch $Q_2$ will provide resistance network 36 with resistors $R_3$ and $R_5$ in parallel providing a timing resistance which will produce an oscillation whose frequency is related to the 1,477 Hz. tone.

The side of capacitor $C_1$ connected to resistance network 36 is connected to a first input terminal 44 of a threshold detector amplifier 42 which has a second, reference input terminal 46. Upon the charging of capacitor $C_1$ to a threshold voltage level, that is, when the voltage on input terminal 44 of threshold detector amplifier 42 becomes greater than the voltage on reference input 46, the output of amplifier 42 goes positive. It is to be noted that threshold detector amplifier 42 is powered by a pair of direct current voltage sources, a positive voltage source $V_2$ of, for example, 12 volts and a negative direct current voltage source $V_3$ of, for example, 12 volts. In addition, reference voltage is supplied to terminal 46 from a voltage divider network including a resistor $R_{10}$, a potentiometer $R_{11}$, and a resistor $R_{12}$ connected between voltage source $V_1$ and ground. Because the same voltage source $V_1$ is used for charging the timing capacitor $C_1$ and for supplying the reference voltage to threshold detector 42, variations in the power supply will have no significant effect upon the frequency of the oscillator. A variable tap 48 of potentiometer $R_{11}$ adjusts the threshold level of threshold detector 42.

When the output of detector 42 goes positive, the change of level is coupled through coupling resistor $R_{13}$ to trigger a one-shot 50. It will be noted that the input circuit of one-shot 50 includes a pair of diodes $CR_1$ and $CR_2$ connected in series across voltage source $V_1$ with the input terminal 51 of one-shot 50 being connected to the junction between the diodes. A second input terminal 52 of one-shot 50 is connected to a terminal 53 to which the logic level signal $\overline{\text{TT KEY}}$ is applied from the transmit gating unit. When touch-tone keying signal $\overline{\text{TT KEY}}$ is pulled down, one-shot 50 is enabled to permit it to provide pulses on output terminal 54. Excitation for the one-shot timing network, $R_{14}$ and $C_2$ is provided by voltage source $V_1$. When one-shot 50 produces a pulse, it is applied through diode $CR_3$ and diode $CR_4$ to the base electrode of a transistor $Q_3$ causing transistor $Q_3$ to turn on and to discharge capacitor $C_1$ through resistor $R_{16}$ which is connected between capacitor $C_1$ and the collector electrode of transistor $Q_3$. A biasing resistor $R_{15}$ connects voltage source $V_1$ to the junction between diodes $CR_3$ and $CR_4$ which are oppositely poled. A negative bias from source $V_3$ is applied to the base electrode of transistor $Q_3$ through a resistor $R_{17}$.

The RC charging time constants are so selected that the frequency of the pulse train produced at output 54 of one-shot 50 is two times the desired frequency. In order to produce a symmetrical square wave of the desired frequency, the pulses from terminal 54 are applied to a divide-by-two flip-flop 60 through an input terminal 61. A square wave of the desired frequency is taken from the uncomplemented output terminal 62 of flip-flop 60. The unused SET input, 63, of the divide-by-two flip-flop 60 is disabled by connection to voltage source $V_1$, and this flip-flop is reset through terminal 64 by a RESET logic signal applied to a terminal 65. The manner in which RESET is developed will be explained hereinbelow.

Although the square wave provided by divide-by-two flip-flop 60 will now be the desired frequency, it will contain undesirable odd harmonics which must be suppressed to provide a tone in sine wave form. This suppression of the harmonics is provided by a relatively simple three-pole 18dB/octave active low pass filter 70 built around amplifier 72. Low pass filter 70 includes a series connected input resistor $R_{20}$, one end of which is connected to an input terminal 74 of amplifier 72. A shunt connected capacitor $C_4$ is connected between terminal 74 and ground. An output resistor $R_{21}$ is connected in series with the output terminal of amplifier 72 and a resistor $R_{22}$. A feedback network includes a capacitor $C_5$ connected between the junction 75 between resistors $R_{21}$ and $R_{22}$ and the input side 76 of resistor $R_{20}$ and a connection between junction 75 and a second input terminal 77 of amplifier 72. An output capacitor $C_6$ is connected between the far end of resistor $R_{22}$ and ground.

Figure 7:
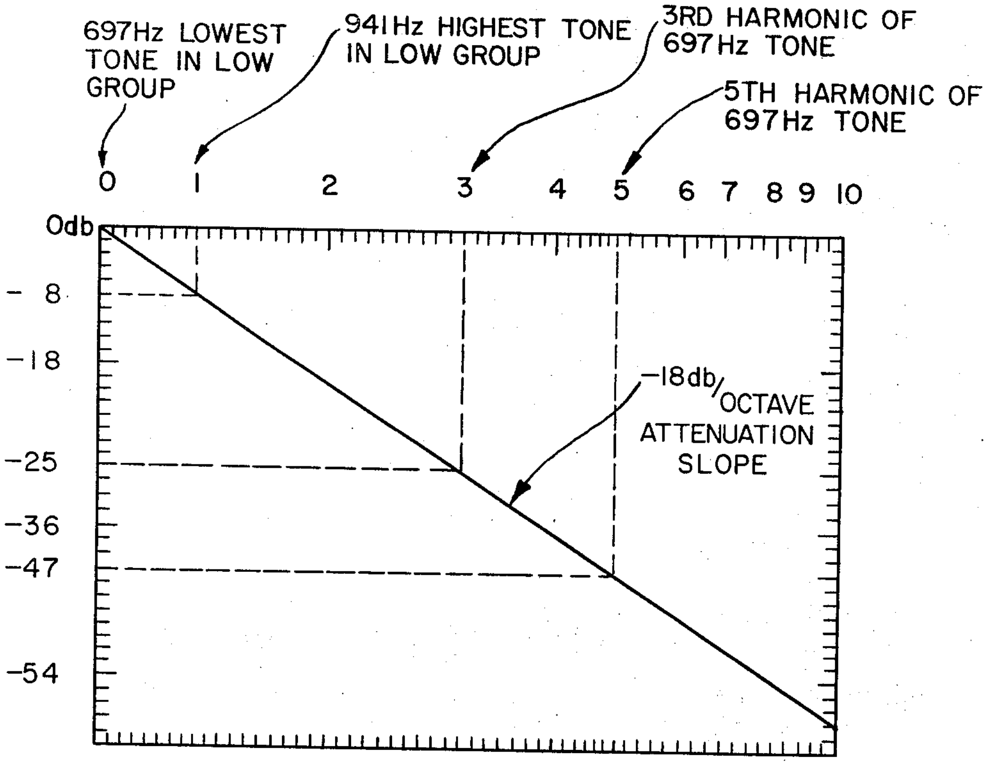
FIG. 7 is a diagram illustrating the characteristic of a filter employed in the embodiment of the invention.

While the 18dB/octave attenuation slope of low pass filter 70 provides approximately 25 dB attenuation of the predominant third harmonic and 47 dB attenuation of the fifth harmonic relative to the fundamental frequency, it also attenuates the fundamental frequencies in the group. This is illustrated in the characteristic curve for the similar filter employed in the "low" group oscillator which is shown in FIG. 7. For the "low" group illustrated in FIG. 7, there is a worst case fundamental contouring of 8dB. It will be understood that low pass filter 70 will provide similar fundamental contouring of the "high" group frequencies.

In accordance with the present invention, this fundamental contouring is compensated for by a programmed weighting network 80. The output from divide-by-two flip-flop 60 is applied to amplitude weighting network 80 through an inverter 82. The amplitude weighting network 80 connects a voltage divider comprising resistor $R_{24}$ and resistor $R_{23}$ across voltage supply $V_1$, the junction 83 between these resistors being connected to the output terminal of inverter 82. At the lowest group frequency 1,209 Hz., the amplitude weighting is determined by resistors $R_{24}$ and $R_{23}$. Provision is made, however, for altering the amplitude weighting when the elected frequency is the 1,336 Hz. or the 1,477 Hz. tone. For this purpose, a terminal 84 is connected to receive the $\overline{1336}$ logic level signal and invert it in inverter 86. The output side of inverter 86 is connected through a diode $CR_5$ to junction 83, and a resistor $R_{25}$ is connected between voltage supply $V_1$ and the output side of inverter 86. When logic level signal $\overline{1336}$ is high, inverter 86 will provide a low level signal at its output side, and diode $CR_5$ will effectively isolate the lower end of resistor $R_{25}$ from junction 83. When, however, logic level signal $\overline{1336}$ goes low, the output terminal of inverter 86 is released and resistor $R_{25}$ is effectively connected through diode $CR_5$ to junction 83 whereby resistor $R_{25}$ is in shunt with resistor $R_{24}$. This will serve to increase the current through resistor $R_{23}$ and increase the resulting square wave amplitude. Of course, the square wave input to inverter 82 modulates the output of inverter 82 at junction 83, periodically pulling the potential of the upper end of resistor $R_{23}$ down. In the same manner, a terminal 85 is connected to receive logic level signal $\overline{1477}$ and apply it to inverter 87. A resistor $R_{26}$ is connected between voltage source $V_1$ and the output side of inverter 87. A diode $CR_6$ will, when logic level signal $\overline{1477}$ is high, prevent effectively the connection of resistor $R_{26}$ in shunt with resistor $R_{24}$. When, however, logic level signal $\overline{1477}$ goes low, the output terminal of inverter 87 is released; and diode $CR_6$ will effectively connect resistor $R_{26}$ in shunt with resistor $R_{24}$. The resistance of the amplitude weighting network will then be appropriate for proper compensation of the amplitude of the 1,477 Hz. fundamental. The weighted square wave at junction 83 is applied to the 18 dB/octave harmonic filter 70 via a high pass network 90, comprising series capacitor $C_3$, shunt resistor $R_{18}$, and series resistor $R_{19}$, which removes the direct current component of the square wave.

Harmonic filter 70 will then remove the third and fifth harmonics as described above and apply the output tone in sine wave form through coupling resistor $R_1$ to summing amplifier 34. Summing amplifier 34 has a feedback resistor $R_{27}$. Power for amplifier 34 is provided from positive voltage source $V_2$ and negative voltage source $V_3$.

Figure 5:
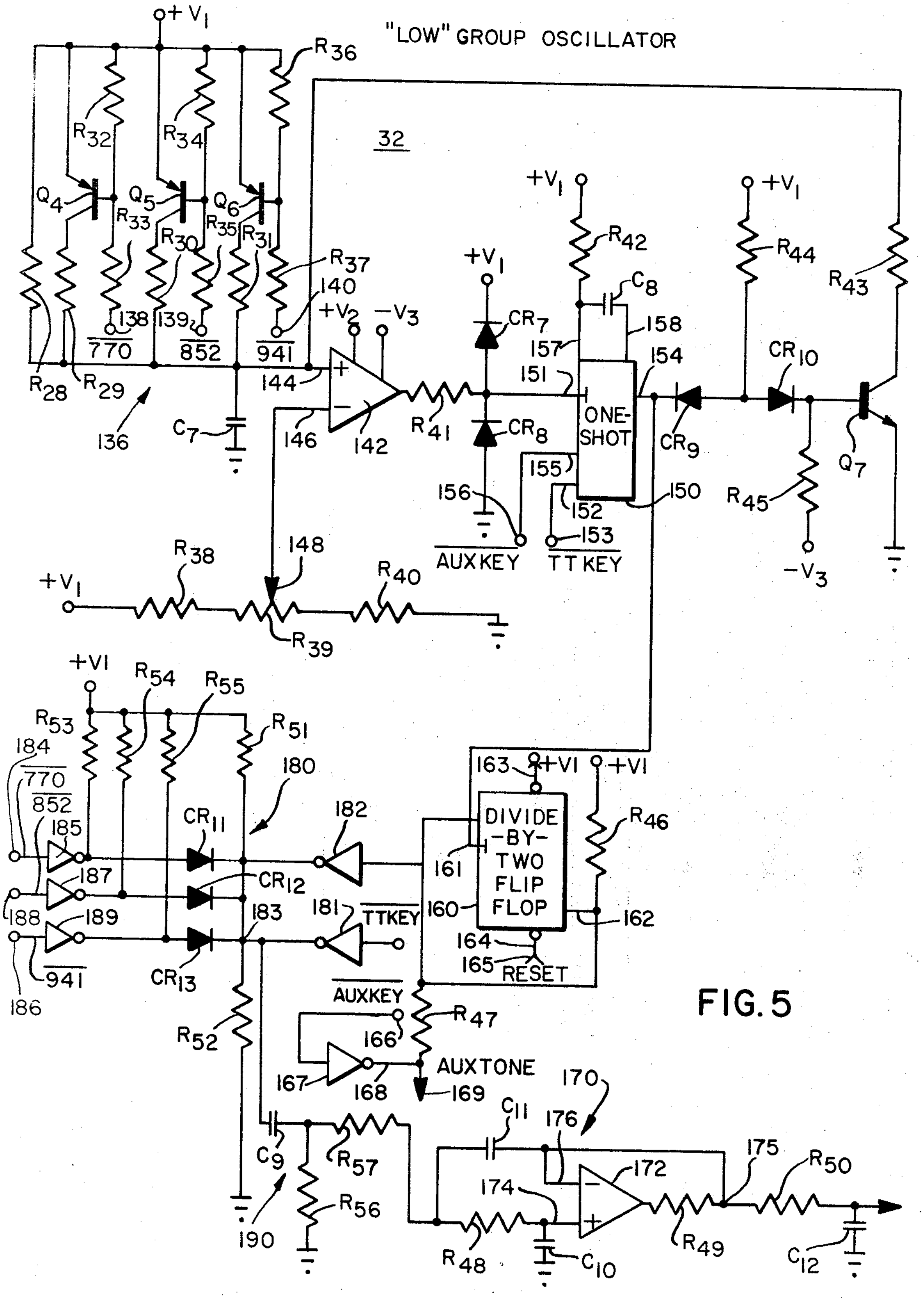
FIG. 5 is a circuit diagram of a "low" group oscillator of the present invention.

The circuit for "low" group touch-tone oscillator 32 is generally similar to that of "high" group oscillator 30 and is shown in FIG. 5. The oscillator includes a resistive network 136 which couples positive direct current voltage source $V_1$ to a storage capacitor $C_7$. Resistive network 136 includes four branches connected in parallel. The first branch comprises a timing resistor $R_{28}$; the second branch includes a timing resistor $R_{29}$; the third includes a timing resistor $R_{30}$; and the fourth branch includes a timing resistor $R_{31}$. It will be noted that resistors $R_{29}$, $R_{30}$ and $R_{31}$ are connected in series, respectively, with transistor switches $Q_4$, $Q_5$, and $Q_6$. A biasing resistor $R_{32}$ connects the base electrode of transistor $Q_4$ to voltage source $V_1$, and a switching signal is applied to a coupling resistor $R_{33}$ from a terminal 138. In particular, the switching signal is the logic level signal $\overline{770}$ provided from the transmitting data logic. When the logic level signal applied to terminal 138 is pulled down, transistor $Q_4$ is turned on to connect resistor $R_{29}$ in parallel with resistor $R_{28}$. Similarly, transistor $Q_5$ has a biasing resistor $R_{34}$ connected between its base electrode and direct current source $V_1$, and a switching signal is applied to coupling resistor $R_{35}$ from terminal 139. In the particular example given, the logic level signal $\overline{852}$ is applied to terminal 139 so that whenever logic level signal $\overline{852}$ is pulled down transistor $Q_5$ will be turned on to connect resistor $R_{30}$ in parallel with resistor $R_{28}$. In like manner, transistor $Q_6$ is connected to voltage source $V_1$ by resistor $R_{36}$, and a switching signal is applied to coupling resistor $R_{37}$ through terminal 140. As shown, logic level signal $\overline{941}$ is applied to terminal 140. Whenever signal $\overline{941}$ is pulled down, transistor $Q_6$ will be turned on to connect resistor $R_{31}$ in parallel with resistor $R_{28}$.

Oscillator 32 has a period of oscillation which is determined by the time it takes to charge capacitor $C_7$. The time constant is determined by timing resistor $R_{28}$ and capacitor $C_7$. In the absence of logic level signals $\overline{770}$, $\overline{852}$, and $\overline{941}$, transistor switches $Q_4$, $Q_5$, and $Q_6$ are non-conducting and the frequency produced by the oscillator will be related to the lowest tone (697 Hz.) in the "low" group. When transistor switch $Q_4$ is turned on, the resistance of resistance network 136, including resistors $R_{28}$ and $R_{29}$ in parallel, will be such that a frequency related to the 770 Hz. tone will be produced. The turning on of transistor switch $Q_5$ will provide resistance network 136 with resistors $R_{28}$ and $R_{30}$ in parallel, providing a timing resistance which will produce an oscillation whose frequency is related to the 852 Hz. tone. Similarly, when transistor $Q_6$ is switched on, the time constant will be determined by resistors $R_{28}$ and $R_{31}$ in parallel to produce a frequency related to the 941 Hz. tone.

When capacitor $C_7$ is charged to a threshold voltage level, the output of a threshold detector amplifier 142 will go positive. This will occur when the voltage on the input terminal 144 of threshold detector amplifier 142 becomes greater than the voltage on reference input 146. Threshold detector amplifier 142 is powered by the voltage sources $V_2$ and $V_3$, and the reference voltage is supplied to terminal 146 from a voltage divider network including a resistor $R_{38}$, a potentiometer $R_{39}$ and a resistor $R_{40}$ connected between voltage source $V_1$ and ground. A variable tap 148 is provided for adjusting the threshold level of threshold detector 142. It is to be noted that capacitor $C_7$ is charged from the same voltage source $V_1$ from which the threshold reference level is obtained. In this way variations in the power supply have no significant effect on the oscillator frequency.

When the output of detector 142 goes positive, the change of level is coupled through coupling resistor $R_{41}$ to trigger a one-shot 150. It will be noted that the input circuit of one-shot 150 includes a pair of diodes $CR_7$ and $CR_8$ connected across voltage source $V_1$ with the input terminal 151 of one-shot 150 being connected to the junction between the diodes. A second input terminal 152 of one-shot 150 is connected to a terminal 153 to which is applied the logic level signal $\overline{TT\ KEY}$ applied from the transmit gating unit. When touch-tone keying signal $\overline{TT\ KEY}$ is pulled down, one-shot 150 is enabled to permit it to provide pulses on output terminal 154. An additional input terminal 155 of one-shot 150 is connected to a terminal 156 to which is applied the $\overline{AUX\ KEY}$ signal from the transmit gating unit. When $\overline{AUX\ KEY}$ is pulled down, one-shot 150 is enabled to permit it to provide pulses on terminal 154. Excitation for the one-shot timing network $R_{42}$ and $C_8$ is provided from voltage source $V_1$. When one-shot 150 produces a pulse, it is applied through diode $CR_9$ and diode $CR_{10}$ to the base electrode of transistor $Q_7$ causing transistor $Q_7$ to turn on and to discharge capacitor $C_7$ through resistor $R_{43}$ which is connected between capacitor $C_7$ and the collector electrode of transistor $Q_7$. It will be noted that a biasing resistor $R_{44}$ connects voltage source $V_1$ to the junction between diodes $CR_9$ and $CR_{10}$ which are oppositely poled. A negative bias from source $V_3$ is applied to the base electrode of transistor $Q_7$ through resistor $R_{45}$.

Figure 6:
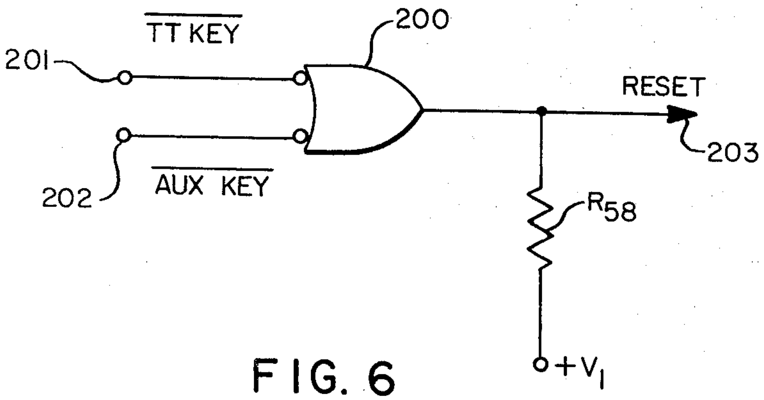
FIG. 6 is a logic circuit employed in the generator of the present invention.

The RC charging time constants are so selected that the pulse train which is produced at output 154 of one-shot 150 has two times the desired frequency. In order to produce a symmetrical square wave of the desired frequency, the pulses from terminal 154 are applied to a divide-by-two flip-flop 160 through an input terminal 161. The output of divide-by-two flip-flop 160 is taken from complement output terminal 162 as a square wave of the desired frequency. The unused SET input of flip-flop 160 is disabled through connection of terminal 163 to voltage source $V_1$. Flip-flop 160 is reset through terminal 164 by a RESET logic signal applied to a terminal 165. The manner in which RESET is derived is illustrated in FIG. 6 which will be described more fully hereinbelow.

In order to generate the AUXTONE (busy signal), $\overline{AUX\ KEY}$ goes low thereby enabling one-shot 150 as described above. Since $\overline{AUX\ KEY}$ is also applied to a terminal 166 which is connected to an inverter 167, the output terminal 168 of the inverter is released when $\overline{AUX\ KEY}$ is pulled down. This will permit the AUXTONE, which is a square wave derived from output terminal 162 of flip-flop 160 and applied without filtering through coupling resistor $R_{47}$, to be present on terminal 169 for use in the handset receiver of the data-terminal as an audible alarm to indicate a busy condition when a third bid for a channel has failed. As explained, in said copending application Ser. No. 296,790, filed Oct. 12, 1972, this will occur when the absence of an idle tone persists through successive attempts by the transmit gating unit to initiate the transmission of data. Pull up resistor $R_{46}$ standardizes the high level at terminal 162 to $+V_1$ potential.

The square wave provided by divide-by-two flip-flop 160 contains undesirable odd harmonics which are suppressed by a three-pole 18 dB/octave active low pass filter 170 built around amplifier 172. Low pass filter 170 includes a series connected input resistor $R_{48}$ connected to an input terminal 174 of amplifier 170 and a shunt connected input capacitor $C_{10}$ connected between terminal 174 and ground. An output resistor $R_{49}$ is connected in series between output terminal of amplifier 172 and a resistor $R_{50}$. A feedback network includes a connection from the junction 175 between resistors $R_{49}$ and $R_{50}$ to a second input terminal 176 of amplifier 172 and a capacitor $C_{11}$ connected between junction 175 and the input side of resistor $R_{48}$. An output capacitor $C_{12}$ is connected between the far end of resistor $R_{50}$ and ground.

While the 18 dB/octave attenuation slope of low pass filter 170 provides approximately 25 dB attenuation of the predominant third harmonic and 47 dB attenuation of the fifth harmonic relative to fundamental frequency, it also attenuates the fundamentals in the "low" group. This is illustrated in the characteristic curve for filter 170 which is shown in FIG. 7. This curve demonstrates that there is a "worst case" fundamental contouring of 8 dB for the highest tone (941 Hz.) in the "low" group.

In order to compensate for this fundamental contouring, a programmed amplitude weighting network 180 is provided. The unweighted square wave output from divide-by-two flip-flop 160 is applied to amplitude weighting network 180 through an inverter 182. Amplitude weighting network 180 includes a voltage divider comprising resistor $R_{51}$ and resistor $R_{52}$ connected in series across voltage supply $V_1$, the junction 183 between these resistors being connected to the output terminal of inverter 182 and also to the output terminal of an inverter 181. At the lowest group frequency 697 Hz., the amplitude weighting is determined by resistors $R_{51}$ and $R_{52}$. Provision is made, however, for altering the amplitude weighting when the selected frequency is one of the 770 Hz., 852 Hz. or 941 Hz. tones. For this purpose, a programmed attenuation control line terminal 184 is connected to receive the $\overline{770}$ logic level signal which is inverted in inverter 185. The output side of inverter 185 is connected through a diode $CR_{11}$ to junction 183, and a resistor $R_{53}$ is connected between voltage supply $V_1$ and the output side of inverter 185. When logic level signal $\overline{770}$ is high, inverter 185 will provide a low level signal at its output side, and diode $CR_{11}$ will effectively isolate the lower end of resistor $R_{53}$ from junction 183. When, however, logic level signal $\overline{770}$ goes low, the output terminal of inverter 185 is released and resistor $R_{53}$ is effectively connected through diode $CR_{11}$ to junction 183 whereby resistor $R_{53}$ is in shunt with resistor $R_{51}$. This will serve to increase the current through resistor $R_{52}$ and increase the resulting square wave amplitude. The square wave input to inverter 182 modulates the output of inverter 182 at junction 183, periodically pulling the potential of the upper end of resistor $R_{52}$ down. In the same manner, a programmed attenuation control line terminal 186 is connected to receive logic level signal $\overline{852}$ and apply it to an inverter 187. A resistor $R_{54}$ is connected between voltage source $V_1$ and the output side of inverter 187. A diode $CR_{12}$ will, when logic level signal $\overline{852}$ is high, effectively prevent the connection of resistor $R_{54}$ in shunt with resistor $R_{51}$. When, however, logic level signal $\overline{852}$ goes low, the output terminal of inverter 187 is released and diode $CR_{12}$ will effectively connect resistor $R_{54}$ in shunt with resistor $R_{51}$. The resistance of the amplitude weighting network will then be appropriate for proper compensation of the amplitude of the 852 Hz. fundamental.

Similar control of the amplitude of the square wave is provided for the 941 Hz. tone. A programmed attenuation control line terminal 188 is connected to receive logic level signal $\overline{941}$ and apply it to inverter 189, the output of which is connected through diode $CR_{13}$ to junction 183. A resistor $R_{55}$ is connected between voltage source $V_1$ and the output side of inverter 189. When logic level signal $\overline{941}$ is high, diode $CR_{12}$ will effectively prevent the connection of resistor $R_{55}$ in shunt with resistor $R_{51}$. When, however, logic level signal $\overline{941}$ is pulled down, the output terminal of inverter 189 will be released and diode $CR_{13}$ will effectively connect resistor $R_{55}$ in shunt with resistor $R_{51}$. The resistance of these parallel connected resistors will then be appropriate for proper compensation of the amplitude of the 941 Hz. fundamental.

The weighted square wave at junction 183 is applied to the 18 dB/octave harmonic filter 170 through a high pass network 190 comprising a series capacitor $C_9$, a shunt resistor $R_{56}$ and a series resistor $R_{57}$. Network 190 removes the direct current component of the square wave. Harmonic filter 170 will then suppress the third and fifth harmonics, as described above, and apply the selected output tone through coupling resistor $R_2$ to summing amplifier 34.

High pass networks 90 and 190 will introduce attack transients in the tones generated by the respective touch-tone oscillators 30 and 32. However, this problem is minimized by the choice of output terminals from flip-flops 60 and 160. As noted above, the unweighted square wave is taken from the complement output 162 of flip-flop 160 and from the uncomplemented output 62 of flip-flop 60 with the result that the tones generated by "high" group oscillator 30 are opposite in phase to the tones generated by "low" group oscillator 32. When the two sine wave tone bursts are finally mixed in summing amplifier 34, the attack transients introduced by high pass networks 90 and 190 will cancel for the most part because they are of opposite polarity. Thus, the attack of the touch-tone bursts is better controlled and thereby the accuracy of decoding at high keying rates by the receiving station apparatus is improved.

Referring to FIG. 6, the manner in which the reset signal RESET is developed will now be described. A first terminal 201 receives the $\overline{\text{TT KEY}}$ signal, and a second terminal 202 receives the $\overline{\text{AUX KEY}}$ signal. Both of these signals are applied to OR gate 200, the output terminal 203 from which is connected to positive bias source $V_1$ through pull up resistor $R_{58}$. RESET will appear on terminal 203 whenever $\overline{\text{TT KEY}}$ or $\overline{\text{AUX KEY}}$ are present on one of terminals 201 and 202. In this way, either $\overline{\text{AUX KEY}}$ or $\overline{\text{TT KEY}}$ going low will result in the release of divide-by-two flip-flops 60 and 160, which are normally held reset, through the terminals 64 and 164 respectively. This insures that these flip-flops start in a known state.

I claim:

1. A tone pair generation system including a first tone oscillator for generating a tone at one of a plurality of desired frequencies comprising, a capacitor, a source of direct current voltage for charging said capacitor, a resistance network coupling said source to said capacitor, said resistance network including a first resistor and at least one branch connected in parallel with said first resistor, said one branch including a second resistor and an electronic switch in series, means for applying a switching signal to said electronic switch, and pulse generating means responsive to the voltage across said capacitor reaching a predetermined threshold for generating a train of pulses, the frequency of said pulses being a function of the resistance value of said resistance network, having a first value when said switching signal is absent and a second, higher value when said switching signal is present, wherein said pulse generating means comprises voltage threshold detector means connected across said capacitor for providing a triggering signal when the charge on said capacitor reaches said predetermined voltage threshold, one-shot generator means for providing a pulse in response to said triggering signal, and means responsive to said pulse for discharging said capacitor, and wherein the pulse frequency generated by said one-shot generator is twice the desired frequency and said oscillator further comprises means coupling the pulses generated by said one-shot generator to a divide-by-two flip-flop, said flip-flop providing a symmetrical square wave at the desired frequency.

2. A tone pair generation system including a first tone oscillator for generating a tone at one of a plurality of desired frequencies comprising, a capacitor, a source of direct current voltage for charging said capacitor, a resistance network coupling said source to said capacitor, said resistance network including a first resistor and at least one branch connected in parallel with said first resistor, said one branch including a second resistor and an electronic switch in series, means for applying a switching signal to said electronic switch, and pulse generating means responsive to the voltage across said capacitor reaching a predetermined threshold for generating a train of pulses, the frequency of said pulses being a function of the resistance value of said resistance network, having a first value when said switching signal is absent and a second, higher value when said switching signal is present, a square wave generation means responsive to said train of pulses for generating a symmetrical square wave at said desired frequency, and wherein said oscillator means includes amplitude weighting means for adjusting the amplitude of said square wave as a function of the frequency of said square wave.

3. A tone pair generation system in accordance with claim 2 wherein said amplitude weighting means comprises a source of direct current voltage connected across a first weighting resistor connected in series with a second weighting resistor, said square wave being coupled to the junction between said first and second weighting resistors, a third weighting resistor, and means responsive to said switching signal for effectively connecting said third weighting resistor in shunt with said first weighting resistor to alter the amplitude weighting of said square wave.

4. A tone pair generation system in accordance with claim 3 wherein said third weighting resistor and a diode are connected in series between said source of direct current voltage and the junction between said first and second weighting resistors and said means responsive to said switching signal maintains the junction between said third weighting resistor and said diode at a relatively low potential in the absence of said switching signal so that said diode effectively isolates said third weighting resistor from said junction between said first and second weighting resistors and, in the presence of said switching signal, maintains said junction between said third weighting resistor and said diode at a relatively high potential so that said diode effectively connects said third weighting resistor to said junction between said first and second weighting resistors.

5. A tone pair generation system including a first tone oscillator for generating a tone at one of a plurality of desired frequencies comprising, a capacitor, a source of direct current voltage for charging said capacitor, a resistance network coupling said source to said capacitor, said resistance network including a first resistor and at least one branch connected in parallel with said first resistor, said one branch including a second resistor and an electronic switch in series, means for applying a switching signal to said electronic switch, and pulse generating means responsive to the voltage across said capacitor reaching a predetermined threshold for generating a train of pulses, the frequency of said pulses being a function of the resistance value of said resistance network, having a first value when said switching signal is absent and a second, higher value when said switching signal is present, a square wave generation means responsive to said train of pulses for generating a symmetrical square wave at said desired frequency, and wherein said tone oscillator further comprises low pass filter means for attenuating undesired odd harmonics of said square wave, and wherein said low pass filter means provides attenuation which increases with frequency thereby attenuating the fundamental frequency of said square wave and wherein said tone oscillator further comprises amplitude weighting means to compensate for said attenuation of said fundamental frequency.

6. A tone pair generation system including a first tone oscillator for generating a tone at one of a plurality of desired frequencies comprising, a capacitor, a source of direct current voltage for charging said capacitor, a resistance network coupling said source to said capacitor, said resistance network including a first resistor and at least one branch connected in parallel with said first resistor, said one branch including a second resistor and an electronic switch in series, means for applying a switching signal to said electronic switch, and pulse generating means responsive to the voltage across said capacitor reaching a predetermined threshold for generating a train of pulses, the frequency of said pulses being a function of the resistance value of said resistance network, having a first value when said switching signal is absent and a second, higher value when said switching signal is present, and a second tone oscillator similar to the first-named tone oscillator, one of said tone oscillators being a "high" group oscillator for providing a selected one of a group of relatively high frequencies, the other of said tone oscillators being a "low" group oscillator for providing a selected one of a group of relatively low frequencies, and means for combining the outputs of said tone oscillators to provide a tone pair signal having tones at one of said relatively high frequencies and one of said relatively low frequencies, and wherein each of said oscillators comprise a high pass network to block the direct current component of the provided tone, said high pass networks introducing attack transients, each of said oscillators comprising means for determining the phase of said provided tone, the hase of said tone provided by said "high" group oscillator being opposite to the phase of said tone provided by said "low" group oscillator, whereby said transients are substantially canceled.

7. A tone pair generation system comprising: a first tone oscillator, a second tone oscillator, each tone oscillator comprising means for generating a selected tone, each tone oscillator comprising a high pass network for blocking the direct current component of the selected tone, said high pass networks introducing attack transients, each of said oscillators comprising means for determining the phase of said provided tone, the phase of said tone provided by said first oscillator being opposite to the phase of said tone provided by said second oscillator, summing means for summing the output from said first and second tone oscillators, whereby said attack transients are substantially canceled.

8. A tone oscillator comprising means for generating a square wave having a selected frequency, low pass filter means for suppressing odd harmonics of said square wave, said low pass filter means providing attenuation which increases with frequency, and amplitude weighting means for compensating for the attenuation of said selected frequency by said filter means, said amplitude weighting means being connected between said square wave generating means and said low pass filter means.

9. A tone oscillator in accordance with claim 8, wherein said oscillator further comprises means responsive to a logic level signal for selecting said selected frequency and wherein said amplitude weighting means comprises means responsive to said logic level signal for selecting a magnitude of amplitude weighting appropriate for said compensation of the attenuation of said selected frequency.

10. A tone oscillator in accordance with claim 9, wherein said amplitude weighting means comprises a source of direct current voltage connected across a first weighting resistor connected in series with a second weighting resistor, said square wave being coupled to the junction between said first and second weighting resistors, a third weighting resistor, and means responsive to said logic level signal for effectively connecting said third weighting resistor in shunt with said first weighting resistor to alter the amplitude weighting of said square wave.

11. A tone oscillator in accordance with claim 10, wherein said third weighting resistor and a diode are connected in series between said source of direct current voltage and the junction between said first and second weighting resistors and said means responsive to said logic level signal maintains the junction between said third weighting resistor and said diode at a relatively low potential in the absence of said logic level signal so that said diode effectively isolates the third weighting resistor from said first and second weighting resistors and, in the presence of said logic level signal, maintains said junction between said third weighting resistor and said diode at a relatively high potential so that said diode effectively connects said third weighting resistor to said junction between said first and second weighting resistors.

* * * * *

UNITED STATES PATENT OFFICE

CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

Assignee reading

"Assignee: Compound Computing Corporation,
Bedford, Wis. "

should read

--Assignee: Concord Computing Corporation
Bedford, Mass.--;

Column 6, line 34 reading

"tude weighting when the elected frequency is the 1,336"

should read

--tude weighting when the selected frequency is the 1,336--;

Column 10, line 22

"When logic level signal $\overline{941}$ is high, diode $CR_{12}$ will ef-"

should read

--When logic level signal $\overline{941}$ is high, diode $CR_{13}$ will ef- --;

FORM PO-1050 (10-69)
USCOMM-DC 60376-P69
U.S. GOVERNMENT PRINTING OFFICE : 1969 O—366-334.

UNITED STATES PATENT OFFICE
CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

Column 13, line 7 reading

"comprise a high pass network to block the direct cur-"

should read

--comprises a high pass network to block the direct cur- --;

Column 13, line 11 reading

"said provided tone, the hase of said tone provided by"

should read

--said provided tone, the phase of said tone provided by--.

Signed and sealed this 5th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334

UNITED STATES PATENT OFFICE
CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

In the Title
"Touch-Tone Signal Generation System"
should read
-- Tone Pair Signal Generation System --.

In the drawings,
Figure 1, block 20, reading
"TOUCH-TONE SIGNAL GENERATOR"
should read
-- TONE PAIR SIGNAL GENERATOR --

Column 1, line 25 reading
"touch tone generators of the type commonly employed"
should read
-- tone pair generators of the type commonly employed --;

Column 1, line 29 reading
"a touch-tone generator which can interface with logic"
should read
-- a tone pair generator which can interface with logic --;

Column 1, line 43 reading
"group. Each of these tone pair, or touch-tone oscilla-"
should read
-- group. Each of these tone pair oscilla- --;

Column 1, line 53 reading
"quency of the touch-tone oscillator. A voltage thresh-"
should read
-- quency of the tone pair oscillator. A voltage thresh- --;

Column 1, line 64 reading
"pacitor. The one-shot generator is enabled by a touch-"

UNITED STATES PATENT OFFICE

CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

should read
-- pacitor. The one-shot generator is enabled by a tone --;

Column 1, line 65 reading
"tone keying signal, and, in the case of the low group os-"
should read
-- pair keying signal, and, in the case of the low group os- --.

Column 2, line 5 reading
"the square wave are undesirable in the touch-tone sig-"
should read
-- the square wave are undesirable in the tone pair sig- --;

Column 2, line 51 reading
"its relationship to a touch-tone signal generator of the"
should read
-- its relationship to a tone pair signal generator of the --;

Column 2, line 57 reading
"FIG. 3 is a block diagram of the touch-tone signal"
should read
-- FIG. 3 is a block diagram of the tone pair signal --.

Column 3, line 7 reading
"the relationship of the touch-tone signal generator of"
should read
-- the relationship of the tone pair signal generator of --;

UNITED STATES PATENT OFFICE

CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

Column 3, line 22 reading
"corresponding lines to touch-tone signal generator 20."
should read
-- corresponding lines to tone pair signal generator 20. --;

Column 3, line 25 reading
"generated by the touch-tone signal generator. These"
should read
-- generated by the tone pair signal generator. These --;

Column 3, line 29 reading
"ing unit 26 provides a touch-tone keying signal TT"
should read
-- ing unit 26 provides a tone pair keying signal TT --;

Column 3, line 31 reading
"touch-tone oscillator 20 only when a signal from an idle"
should read
-- tone pair oscillator 20 only when a signal from an idle --;

Column 3, line 37 reading
"26 is a logic unit for enabling touch-tone generator 20"
should read
-- 26 is a logic unit for enabling tone pair generator 20 --;

Column 3, line 47 reading
"with of touch-tone signal generator 20 have been in-"
should read
-- with of tone pair signal generator 20 have been in- --;

UNITED STATES PATENT OFFICE

CERTIFICATE OF CORRECTION

Patent No. 3,824,484 Dated July 16, 1974

Inventor(s) Timothy C. Gillette

It is certified that error appears in the above-identified patent and that said Letters Patent are hereby corrected as shown below:

Column 3, line 53 reading
"touch-tone signal generator 20 will be seen. Twelve"
should read
-- tone pair signal generator 20 will be seen. Twelve --.

Column 4, line 3 reading
"Turning to FIG. 3, it will be seen that touch-tone sig-"
should read
-- Turning to FIG. 3, it will be seen that tone pair sig- --;

Column 4, line 4 reading
"nal generator 20 comprises a pair of touch-tone oscilla-"
should read
-- nal generator 20 comprises a pair of tone oscilla- --;

Column 4, line 12 reading
"touch-tone keying signal $\overline{\text{TT KEY}}$ to both oscillators 30"
should read
-- tone pair keying signal $\overline{\text{TT KEY}}$ to both oscillators 30 --;

Column 4, line 19 reading
"which the touch-tone pairs are applied to the hybrid"
should read
-- which the tone pairs are applied to the hybrid --.

Column 8, line 23 reading
"plied from the transmit gating unit. When touch-tone"
should read
-- plied from the transmit gating unit. When tone pair --.

UNITED STATES PATENT OFFICE

CERTIFICATE OF CORRECTION

Patent No. 3,824,484 Dated July 16, 1974

Inventor(s) Timothy C. Gillette Page 5

It is certified that error appears in the above-identified patent and that said Letters Patent are hereby corrected as shown below:

Column 10, line 54 reading
"polarity. Thus, the attack of the touch-tone bursts is"
should read
-- polarity. Thus, the attack of the tone pair bursts is --.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*